US008613344B2

(12) United States Patent
Veronesi

(10) Patent No.: US 8,613,344 B2
(45) Date of Patent: Dec. 24, 2013

(54) LINE CURRENT AND ENERGY STORAGE CONTROL FOR AN ELEVATOR DRIVE

(75) Inventor: William A. Veronesi, Hartford, CT (US)

(73) Assignee: Otis Elevator Company, Farmington, CT (US)

( * ) Notice: Subject to any disclaimer, the term of this patent is extended or adjusted under 35 U.S.C. 154(b) by 346 days.

(21) Appl. No.: 13/059,100

(22) PCT Filed: Aug. 15, 2008

(86) PCT No.: PCT/US2008/009778
§ 371 (c)(1),
(2), (4) Date: Feb. 15, 2011

(87) PCT Pub. No.: WO2010/019122
PCT Pub. Date: Feb. 18, 2010

(65) Prior Publication Data
US 2011/0139550 A1    Jun. 16, 2011

(51) Int. Cl.
*B66B 1/06* (2006.01)
(52) U.S. Cl.
USPC .......................................... 187/290; 187/393
(58) Field of Classification Search
USPC ................ 187/247, 290, 293, 295, 296, 297, 187/391–393; 318/375–377, 799–815; 307/669, 69, 66
See application file for complete search history.

(56) References Cited

U.S. PATENT DOCUMENTS

| 4,506,766 A * | 3/1985 | Watanabe | 187/290 |
|---|---|---|---|
| 4,554,999 A * | 11/1985 | Kamaike | 187/290 |
| 6,315,081 B1 * | 11/2001 | Yeo | 187/290 |
| 6,422,351 B2 * | 7/2002 | Tajima et al. | 187/290 |
| 6,439,347 B2 * | 8/2002 | Suga et al. | 187/290 |
| 6,471,013 B2 * | 10/2002 | Banno et al. | 187/290 |
| 6,474,447 B2 * | 11/2002 | Tajima et al. | 187/290 |
| 6,533,074 B2 * | 3/2003 | Tominaga et al. | 187/290 |
| 6,827,182 B2 * | 12/2004 | Araki | 187/290 |
| 7,275,622 B2 * | 10/2007 | Hall et al. | 187/290 |
| 8,127,894 B2 * | 3/2012 | Agirman et al. | 187/290 |
| 8,220,590 B2 * | 7/2012 | Chen et al. | 187/290 |
| 2001/0011618 A1 | 8/2001 | Tajima et al. | |
| 2011/0139547 A1 * | 6/2011 | Veronesi et al. | 187/247 |

FOREIGN PATENT DOCUMENTS

| JP | 2002302359 A | 10/2002 |
|---|---|---|
| JP | 2003299250 A | 10/2003 |
| JP | 2003333891 A | 11/2003 |

(Continued)

OTHER PUBLICATIONS

Translation JP2005057846 A.*
Office Action of the Japanese Patent Office in application No. 2011-522945, dated Oct. 29, 2012.
Office Action of the Korean Patent Office in Application No. 10-2011-7006008, dated Aug. 21, 2012.

(Continued)

*Primary Examiner* — Anthony Salata
(74) *Attorney, Agent, or Firm* — Kinney & Lange, P.A.

(57) ABSTRACT

Power distribution is managed between a regenerative drive (10) connected to an elevator hoist motor (12), and a primary power supply (20) and electrical energy storage (EES) system (36) connected to the regenerative drive. A state-of-charge (SOC) of the EES system and a primary current flow between the primary power supply and the regenerative drive are measured. A direction and magnitude of secondary current flow between the EES system and the regenerative drive is then controlled as a function of the primary current flow and the SOC of the EES system. SOC of the EES system is maintained in a limited range except as necessary to maintain primary current flow below a threshold current.

20 Claims, 2 Drawing Sheets

(56) References Cited

FOREIGN PATENT DOCUMENTS

| | | | |
|---|---|---|---|
| JP | 2005057846 | A | 3/2005 |
| KR | 20020036654 | A | 5/2002 |
| WO | 0174699 | A | 10/2001 |

OTHER PUBLICATIONS

Official Search Report and Written Opinion of the Patent Cooperation Treaty Office in foreign counterpart Application No. PCT/US2008/09778, filed Aug. 15, 2008.
Japanese Patent Office, Office Action, 2 pages, Sep. 17, 2013.

* cited by examiner

LINE CURRENT AND ENERGY STORAGE CONTROL FOR AN ELEVATOR DRIVE

BACKGROUND

The present invention relates to power systems. More specifically, the present invention relates to a system for managing power from a secondary power source in an elevator system from multiple sources to control power drawn from a primary power source.

The power demands for operating elevators range from highly positive, in which externally generated power (such as from a power utility) is used at a maximal rate, to negative, in which the load in the elevator drives the motor so it produces electricity as a generator. The use of the motor to produce electricity as a generator is commonly called regeneration. In conventional systems, if the regenerated energy is not provided to another component of the elevator system or returned to the utility grid, it is dissipated through a dynamic brake resistor or other load. In this configuration, all demand remains on the power utility to supply power to the elevator system, even during peak power conditions (e.g., when more than one motor starts simultaneously or during periods of high demand). Thus, components of the elevator system that deliver power from the power utility need to be sized to accommodate power demand surges, which may consume a large amount of space in the building. Also, the regenerated energy that is dissipated is not used, thereby decreasing the efficiency of the power system.

In addition, an elevator drive system is typically designed to operate over a specific input voltage range from a primary power supply, such as a utility power source. The components of the drive have voltage and current ratings that allow the drive to continuously operate while the power supply remains within the designated input voltage range. When the utility voltage sags and/or during periods of peak power demand by the drive system components, the elevator system draws more current from the power supply to maintain uniform power to the hoist motor, increasing the overall cost of powering the elevator system. Some conventional systems attempt to alleviate the power demand by connecting a secondary power supply to provide supplemental power to the elevator drive system. However, this does not prevent the elevator drive system from drawing excessive current from the primary power supply, which burdens the components connected to the primary power supply and increases the overall cost of operating the elevator drive system.

SUMMARY

The present invention relates to managing power distribution between a regenerative drive connected to an elevator hoist motor, and a primary power supply and electrical energy storage (EES) system connected to the regenerative drive. A state-of-charge (SOC) of the EES system and a primary current flow between the primary power supply and the regenerative drive are measured. A direction and magnitude of secondary current flow between the EES system and the regenerative drive is then controlled as a function of the primary current flow and the SOC of the EES system.

DETAILED DESCRIPTION

Figure 1:
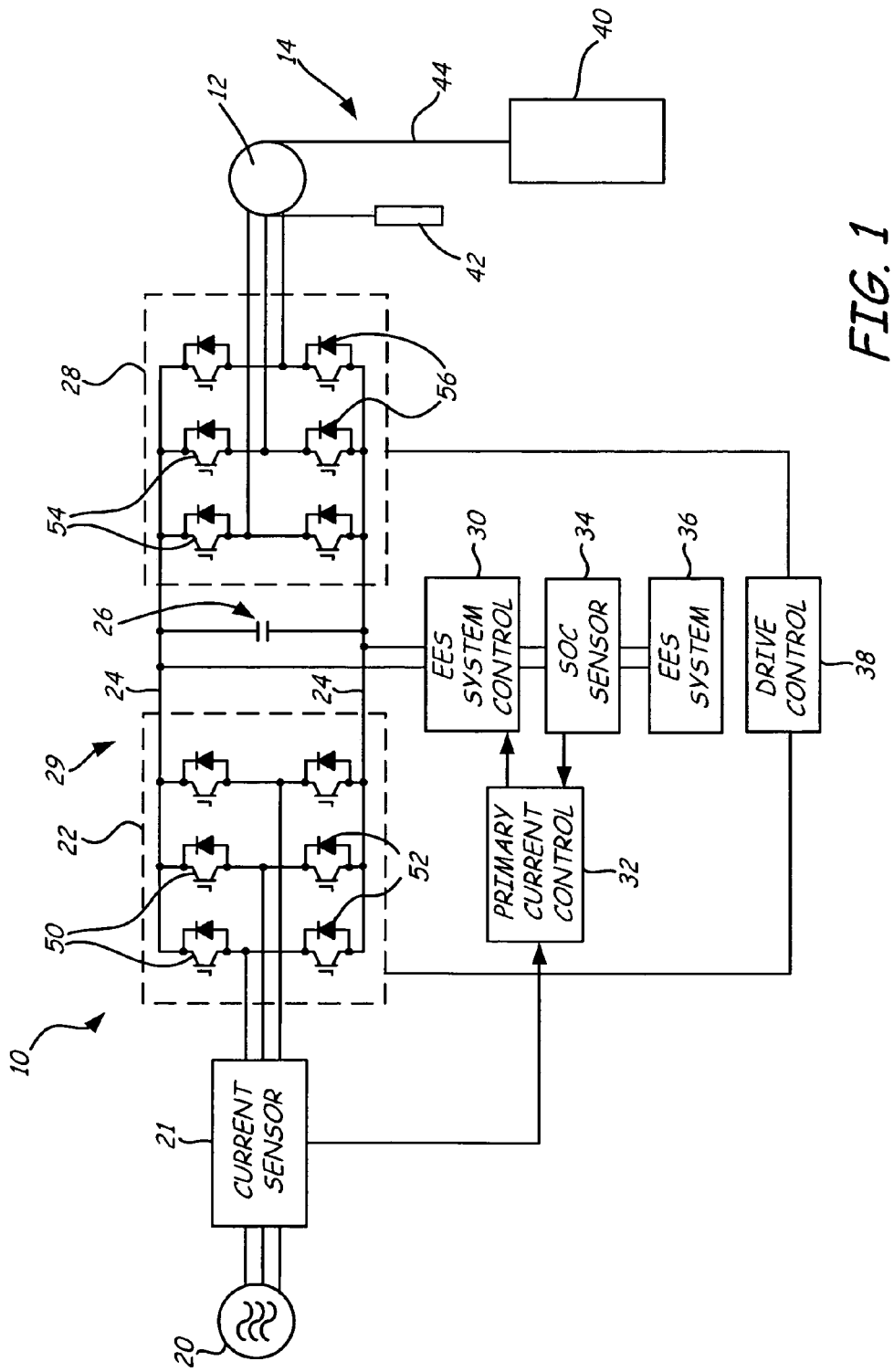
FIG. 1 is a schematic view of an elevator power system including a controller for monitoring current from a primary power supply and managing power to the elevator system based on this current.

FIG. 1 is a schematic view of power system 10 including primary power supply 20, current sensor 21, power converter 22, power bus 24, smoothing capacitor 26, power inverter 28, electrical energy storage (EES) system control 30, primary current control module 32, EES system state-of-charge (SOC) sensor 34, electrical energy storage (EES) system 36, and drive controller 38. EES system control module 30 and primary current control module 32 may collectively be referred to as the power management module of power system 10. Power converter 22, power bus 24, smoothing capacitor 26, and power inverter 28 are included in regenerative drive 29. Primary power supply 20 may be an electrical utility, such as a commercial power source. EES system 36 includes a device or a plurality of devices capable of storing electrical energy. Elevator 14 includes elevator car 40 and counterweight 42 that are connected through roping 44 to hoist motor 12.

As will be described herein, power system 10 is configured to control power exchanged between elevator hoist motor 12, primary power supply 20, and/or EES system 36 to address power demand of hoist motor 12 based on current sensed by current sensor 21 and to maintain the state-of-charge (SOC) of EES system 36 as sensed by SOC sensor 34 within a SOC range. Power system 10 controls power distributed to and from EES system 36 to limit the amount of current drawn from or sent to primary power supply 20. In addition, power system 10 also controls distribution of power between regenerative drive 29 and EES system 36 when the power demand of elevator hoist motor 12 is approximately zero or negative, and between EES system 36 and elevator hoist motor 12 in the event of failure of primary power supply 20.

Power converter 22 and power inverter 28 are connected by power bus 24. Smoothing capacitor 26 is connected across power bus 24. Primary power supply 20 provides electrical power to or receives electrical power from power converter 22. Current sensor 21 measures the current flow between primary power supply 20 and power converter 22. Power converter 22 is a three-phase power inverter that is operable to convert three-phase AC power from primary power supply 20 to DC power. In one embodiment, power converter 22 comprises a plurality of power transistor circuits including parallel-connected transistors 50 and diodes 52. Each transistor 50 may be, for example, an insulated gate bipolar transistor (IGBT). The controlled electrode (i.e., gate or base) of each transistor 50 is connected to drive controller 38. Drive controller 38 controls the power transistor circuits to convert the three-phase AC power from primary power supply 20 to DC output power. The DC output power is provided by power converter 22 on power bus 24. Smoothing capacitor 26 smoothes the rectified power provided by power converter 22 on DC power bus 24. It is important to note that while primary power supply 20 is shown as a three-phase AC power supply, power system 10 may be adapted to receive power from any type of power source, including (but not limited to) a single phase AC power source and a DC power source.

The power transistor circuits of power converter 22 also allow power on power bus 24 to be inverted and provided to primary power supply 20. In one embodiment, drive controller 38 employs pulse width modulation (PWM) to produce gating pulses so as to periodically switch transistors 50 of power converter 22 to provide a three-phase AC power signal to primary power supply 20. This regenerative configuration reduces the demand on primary power supply 20.

Power inverter 28 is a three-phase power inverter that is operable to invert DC power from power bus 24 to three-phase AC power. Power inverter 28 comprises a plurality of power transistor circuits including parallel-connected transistors 54 and diodes 56. Each transistor 54 may be, for example, an insulated gate bipolar transistor (IGBT). The controlled electrode (i.e., gate or base) of each transistor 54 is connected to drive controller 38, which controls the power transistor circuits to invert the DC power on power bus 24 to three-phase AC output power. The three-phase AC power at the outputs of power inverter 28 is provided to hoist motor 12. In one embodiment, drive controller 38 employs PWM to produce gating pulses to periodically switch transistors 54 of power inverter 28 to provide a three-phase AC power signal to hoist motor 12. Drive controller 38 may vary the speed and direction of movement of elevator 14 by adjusting the frequency and magnitude of the gating pulses to transistors 54.

In addition, the power transistor circuits of power inverter 54 are operable to rectify power that is generated when elevator 14 drives hoist motor 12. For example, if hoist motor 12 is generating power, drive controller 38 controls transistors 54 in power inverter 28 to allow the generated power to be converted and provided to DC power bus 24. Smoothing capacitor 26 smoothes the converted power provided by power inverter 28 on power bus 24. The regenerated power on DC power bus 24 may be used to recharge the EES elements of EES system 36, or may be returned to primary power supply 20 as described above.

Hoist motor 12 controls the speed and direction of movement between elevator car 40 and counterweight 42. The power required to drive hoist motor 12 varies with the acceleration and direction of elevator 14, as well as the load in elevator car 40. For example, if elevator car 40 is being accelerated, run up with a load greater than the weight of counterweight 42 (i.e., heavy load), or run down with a load less than the weight of counterweight 42 (i.e., light load) power is required to drive hoist motor 12. In this case, the power demand for hoist motor 12 is positive. If elevator car 40 is being decelerated, running down with a heavy load, or running up with a light load, elevator car 40 drives hoist motor 12. In this case of negative power demand, hoist motor 12 generates three-phase AC power that is converted to DC power by power inverter 28 under the control of drive controller 38. As described above, the converted DC power may be returned to primary power supply 20, used to recharge EES system 36, and/or dissipated in a dynamic brake resistor connected across power bus 24. If elevator 14 is leveling or running at a fixed speed with a balanced load, it may be using a lesser amount of power. If hoist motor 12 is neither motoring nor generating power, the power demand of hoist motor is approximately zero.

It should be noted that while a single hoist motor 12 is shown connected to power system 10, power system 10 can be modified to power multiple hoist motors 12. For example, a plurality of power inverters 28 may be connected in parallel across power bus 24 to provide power to a plurality of hoist motors 12. In addition, while EES system 36 is shown connected to DC power bus 24, EES system 36 may alternatively be connected to one phase of the three phase input of power converter 22.

EES system 36 may include one or more devices capable of storing electrical energy that are connected in series or parallel. In some embodiments, EES system 36 includes at least one supercapacitor, which may include symmetric or asymmetric supercapacitors. In other embodiments, EES system 36 includes at least one secondary or rechargeable battery, which may include any of nickel-cadmium (NiCd), lead acid, nickel-metal hydride (NiMH), lithium ion (Li-ion), lithium ion polymer (Li-Poly), iron electrode, nickel-zinc, zinc/alkaline/manganese dioxide, zinc-bromine flow, vanadium flow, and sodium-sulfur batteries. EES system 36 may include one type of EES devices or may include combinations of EES devices.

Figure 2:
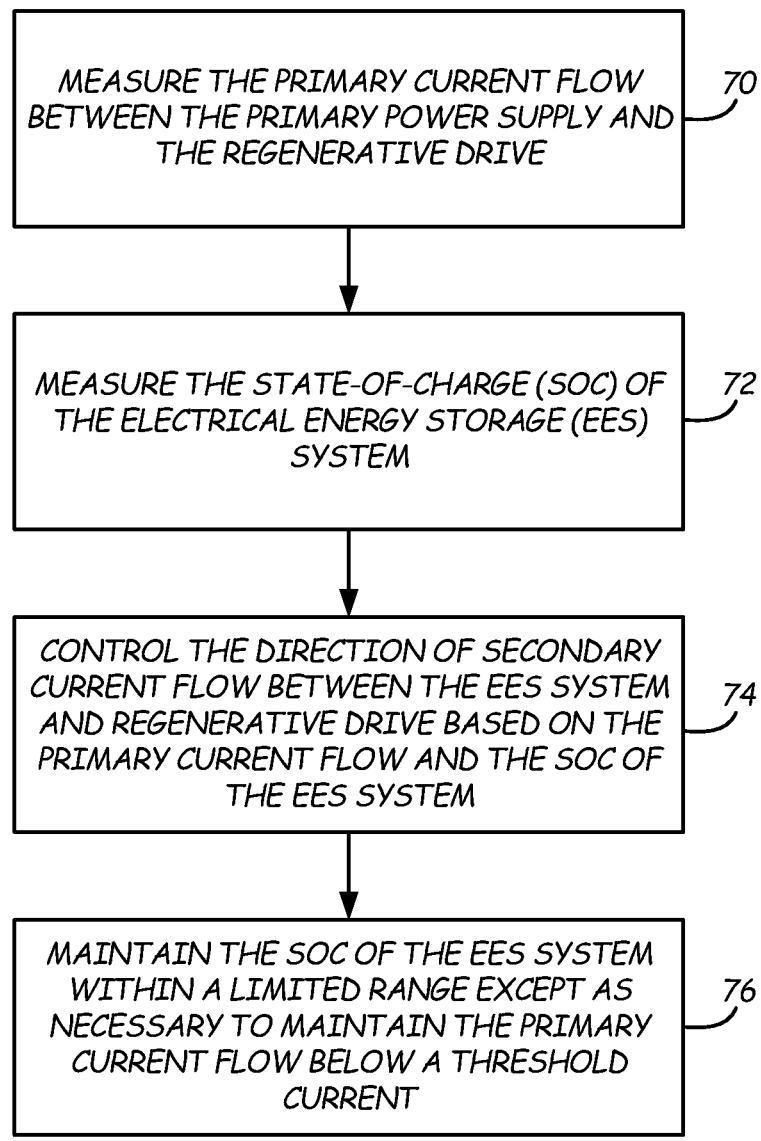
FIG. 2 is a flow diagram of a process for managing power exchanged between a hoist motor, primary power supply, and EES system based on the primary power supply current and a state-of-charge (SOC) of the EES system.

FIG. 2 is a flow diagram of a process for managing power exchanged between hoist motor 12, primary power supply 20, and EES system 36. The current flow between primary power supply 20 and power converter 22 (which may be referred to as the primary current flow) is sensed by current sensor 21 (step 70). The primary current flow may be from primary power supply 20 to power converter 22 during periods of positive power demand by elevator hoist motor 12, or to supply power to recharge EES system 36 via power bus 24 during periods of zero hoist motor power demand. The primary current flow may also be from power converter 22 to primary power supply 20 during periods of negative power demand by elevator hoist motor 12, or when the SOC of EES system 36 is outside of the preferred SOC range and power from EES system 36 is returned to power bus 24. The current measurement by current sensor 21 is supplied to primary current control 32.

The state-of-charge (SOC) of EES system 36 is also measured by SOC sensor 34 (step 72). The measured SOC of EES system 36 may be based on any or all of the voltage across EES system 36, the current through EES system 36, and the temperature of EES system 36. A signal related to the measured SOC of EES system 36 is provided to primary current control module 32.

Primary current control module 32 then provides signals to EES system control module 30 to control the direction of current flow between EES system 36 and power bus 24 of regenerative drive 29 (step 74). The signal provided by primary current control module 32 to EES system control module 30 is based on the primary current flow measured by current sensor 21 and the SOC of EES system 36 measured by SOC sensor 34. Based on this signal, EES system control module 30 controls the magnitude and direction of current from EES system 36 to assure that the current drawn from primary power supply 20 remains below a threshold current (which may be stored in primary current control module 32), and the SOC of EES system 36 remains within a SOC range. These controls provide for a reduction in the power consumed by power system 10 from primary power supply 20, which results in lower costs to operate power system 10. The size of the components of power converter 22 can also be reduced, since the amount of current exchanged between primary power supply 20 and power converter 22 is controlled. Furthermore, the life of EES system 36 is extended because the SOC range of EES system 36 is controlled.

In operation, power converter 22 controls the energy passed between primary power supply 20 and power bus 24 to maintain the voltage on power bus 24 at an operating voltage. Thus, if the voltage on power bus 24 exceeds the operating voltage, drive control 38 operates power converter 22 to return energy from power bus 24 to primary power source 20. On the other hand, if the voltage on power bus 24 drops below the operating voltage, drive control 38 operates power converter 22 to draw energy from primary power source 20 to increase the voltage on power bus 24.

At times, the primary current may exceed the current threshold, such as when elevator hoist motor 12 is starting up (which results in a brief spike in positive power demand) or when elevator hoist motor 12 is regenerating a large amount power during periods of negative power demand. When the primary current sensed by current sensor 21 exceeds the current threshold, primary current control 32 commands EES system control 30 to adjust the secondary current supplied to power bus 24 by EES system 36 to reduce the burden on primary power supply 20.

For example, when the power demand of elevator hoist motor 12 is highly positive, primary current control module 38 commands EES system control module 30 to supply power from EES system 36 to power bus 24 to reduce the primary current flow from primary power supply 20 below the current threshold. In some embodiments, primary current control module 38 commands EES system control module 30 to supply power from EES system 36 to power bus 24 until the SOC of EES system 36 reaches a minimum threshold SOC. This keeps the SOC of EES system 36 within a limited SOC range, thereby prolonging the life of EES system 36. Alternatively, in order to maintain the primary current below the current threshold, primary current control module 38 may command EES system control module 30 to continue to supply power to power bus 24 regardless of the SOC of EES system 36 (step 76).

When the power demand of elevator hoist motor 12 is highly negative, primary current module 32 commands EES system control module 30 to draw power from power bus 24 to EES system 36 to reduce the primary current flow to primary power supply 20 below the current threshold. In some embodiments, primary current control module 38 commands EES system control module 30 to draw power from power bus 24 to EES system 36 until the SOC of EES system 36 reaches a maximum threshold SOC (to keep the SOC within a limited SOC range). Alternatively, in order to maintain the primary current below the current threshold, primary current control module 38 may command EES system control module 30 to continue to draw power from power bus 24 regardless of the SOC of EES system 36 (step 76).

When the power demand of elevator hoist motor 12 is approximately zero (that is, hoist motor 12 is neither motoring nor regenerating power), primary current control module 32 monitors the SOC of EES system 36 as measured by SOC sensor 34. Primary current control module 32 commands EES system control module 30 to exchange power with power bus 24 to bring the SOC of EES system 36 within a desired SOC range. In some embodiments, primary current control module 32 sets a target SOC for EES system 36, and EES system control module 30 controls energy exchanged between power bus 24 and EES system 36 to reach the target SOC. By restoring the SOC of EES system 36 to a target SOC, EES system 36 maintains sufficient power to supplement primary power supply 20 when the primary current exceeds the current threshold.

In the event of a failure of primary power supply 20, EES system 32 addresses all demand of hoist motor 12. Primary current control 32 generates signals to command EES system control module 30 to provide all energy required to drive hoist motor 12 during periods of positive demand, and to store all energy generated by hoist motor 12 during periods of negative demand. In some embodiments, all demand of hoist motor 12 is addressed by EES system 32 regardless of the SOC of EES system 32. In other embodiments, the demand of hoist motor 12 is addressed while the SOC of EES system 32 is within a limited SOC range.

In summary, the present invention relates to managing power distribution between a regenerative drive connected to an elevator hoist motor, and a primary power supply and electrical energy storage (EES) system connected to the regenerative drive. A state-of-charge (SOC) of the EES system and a primary current flow between the primary power supply and the regenerative drive are measured. A direction and magnitude of secondary current flow between the EES system and the regenerative drive is then controlled as a function of the primary current flow and the SOC of the EES system. These controls provide for a reduction in the power consumed by the elevator system from the primary power supply, which results in lower operating costs for the elevator system. The size of the components of the regenerative drive can also be reduced, since the amount of current exchanged between the primary power supply and regenerative drive is controlled.

Although the present invention has been described with reference to preferred embodiments, workers skilled in the art will recognize that changes may be made in form and detail without departing from the spirit and scope of the invention.

The invention claimed is:

1. A method for managing power distribution between a regenerative drive connected to an elevator hoist motor, and a primary power supply and electrical energy storage (EES) system connected to the regenerative drive, the method comprising:
measuring a primary current flow between the primary power supply and the regenerative drive;
measuring a state-of-charge (SOC) of the EES system;
controlling a direction and magnitude of secondary current flow between the EES system and the regenerative drive as a function of the primary current flow and the SOC of the EES system; and
maintaining the SOC of the EES system within a limited SOC range except as necessary to maintain the primary current flow below a threshold current.

2. The method of claim 1, wherein the controlling step comprises:
maintaining the primary current flow below the threshold current.

3. The method of claim 2, wherein the maintaining the primary current flow step comprises:
adjusting energy supplied from the EES system to the regenerative drive to address hoist motor power demand that exceeds primary power supply power at the threshold current.

4. The method of claim 1, wherein the controlling step comprises:
storing energy from the regenerative drive to the EES system during periods of negative or zero elevator hoist motor power demand.

5. The method of claim 1, wherein the maintaining step comprises:
storing energy from the regenerative drive to the EES system during periods of negative or zero elevator hoist motor power demand until the SOC of the EES system reaches a maximum threshold SOC.

6. The method of claim 1, wherein the maintaining step comprises:
supplying energy to the regenerative drive from the EES system until the SOC of the EES system reaches a minimum threshold SOC.

7. A system for managing power distribution between a regenerative drive connected to an elevator hoist motor, and a primary power supply and electrical energy storage (EES) system connected to the regenerative drive, the system comprising:
a current sensor operable to measure a primary current flow between the primary power supply and the regenerative drive;

a state-of-charge (SOC) sensor operable to measure a SOC of the EES system; and a power management module operable to control a direction and magnitude of secondary current flow between the EES system and the regenerative drive as a function of the primary current flow and the SOC of the EES system such that the power management module maintains the SOC of the EES system within a limited SOC range except as necessary to maintain the primary current flow below a threshold current.

8. The system of claim 7, wherein the power management module is operable to maintain the primary current flow below a threshold current.

9. The system of claim 8, wherein the power management module is operable to adjust energy supplied from the EES system to the regenerative drive to address hoist motor power demand that exceeds primary power supply power at a threshold primary current.

10. The system of claim 7, wherein the power management module is operable to store energy from the regenerative drive to the EES system during periods of negative or zero elevator hoist motor power demand.

11. The system of claim 7, wherein the power management module is operable to supply energy from the regenerative drive to the EES system during periods of negative or zero elevator hoist motor power demand until the SOC of the EES system reaches a threshold SOC.

12. The system of claim 7, wherein the power management module is operable to supply energy to the regenerative drive from the EES system when the SOC of the EES system is above a target SOC.

13. A method for managing power distribution between a regenerative drive connected to an elevator hoist motor, and a primary power supply and electrical energy storage (EES) system connected to the regenerative drive, the method comprising:

monitoring a first current flow between the primary power supply and the regenerative drive;

controlling a direction and magnitude of a second current flow between the EES system and the regenerative drive as a function of the first current flow and power demand of the elevator hoist motor; and maintaining a state-of-charge (SOC) of the EES system within a limited SOC range except as necessary to maintain the first current flow below a threshold current.

14. The method of claim 13, wherein the controlling step comprises:

adjusting energy supplied from the EES system to the regenerative drive to address hoist motor power demand that exceeds primary power supply power at a threshold current.

15. The method of claim 13, wherein the controlling step comprises:

storing energy from the regenerative drive to the EES system during periods of negative or zero elevator hoist motor power demand.

16. The method of claim 13, wherein the maintaining step comprises:

storing energy from the regenerative drive to the EES system during periods of negative or zero elevator hoist motor power demand until the SOC of the EES system reaches a maximum threshold SOC; and supplying energy to the regenerative drive from the EES system until the SOC of the EES system reaches a minimum threshold SOC.

17. The method of claim 1, wherein the limited SOC range is sufficiently narrow to allow the EES system to either supply power or receive power to reduce the primary current flow when the primary current flow exceeds the threshold current.

18. The method of claim 1, wherein the maintaining step comprises:

setting a target SOC within the limited SOC range; and adjusting the SOC of the EES system toward the target SOC in response to power demand of the elevator hoist motor becoming approximately zero.

19. The system of claim 7, wherein the limited SOC range is sufficiently narrow to allow the EES system to either supply power or receive power to reduce the primary current flow when the primary current flow exceeds the threshold current.

20. The method of claim 13, wherein the maintaining step comprises:

setting a target SOC within the limited SOC range; and adjusting the SOC of the EES system toward the target SOC in response to power demand of the elevator hoist motor becoming approximately zero.

* * * * *